United States Patent [19]

Thomas et al.

[11] 4,282,987
[45] Aug. 11, 1981

[54] BEVERAGE DISPENSING AND METERING APPARATUS

[76] Inventors: Ronald C. Thomas; Ronald G. Thomas, both of P.O. Box 5747, Nashville, Tenn. 37208

[21] Appl. No.: 963,412

[22] Filed: Nov. 24, 1978

[51] Int. Cl.³ .......................... B67D 5/12; B67D 5/64
[52] U.S. Cl. ..................................... 222/70; 221/125; 222/75; 222/135
[58] Field of Search ....................... 222/70, 74, 75, 76, 222/135, 143, 144.5; 221/125, 129

[56] References Cited

U.S. PATENT DOCUMENTS

| | | | |
|---|---|---|---|
| 3,349,881 | 10/1967 | Camp | 221/125 X |
| 3,355,068 | 11/1967 | Harland et al. | 222/70 X |
| 3,409,175 | 11/1968 | Byrne | 222/70 |
| 3,777,937 | 12/1973 | Buck | 222/70 |
| 3,940,019 | 2/1976 | Kross et al. | 222/70 X |
| 3,976,222 | 8/1976 | Spagnolo | 222/70 |
| 4,076,146 | 2/1978 | Lausberg et al. | 222/70 X |

Primary Examiner—Robert J. Spar
Assistant Examiner—Edward M. Wacyra

Attorney, Agent, or Firm—Harrington A. Lackey

[57] ABSTRACT

A beverage dispensing and metering apparatus adapted to be mounted in a stationary cabinet structure or a portable suitcase-type housing, including an electrically driven liquid pump and push-button switch for each liquid or beverage to be dispensed. The electronic controls include a timer circuit to permit the dispensing of a predetermined amount of liquid during depression of the corresponding push-button. The control circuitry permits dispensing any amount of liquid less than the predetermined amount for the period the push-button is depressed. The control circuitry also permits the dispensing of amounts of liquid greater than the predetermined amount upon re-depression of the corresponding push-button. The control circuitry further includes interlocking circuitry for the push-button switches to permit the dispensing of only one liquid at a time. The portable modification of the beverage dispensing and metering apparatus includes a retractable spout and a photoelectric safety switch to permit dispensing of liquids only when the spout is protracted.

9 Claims, 9 Drawing Figures

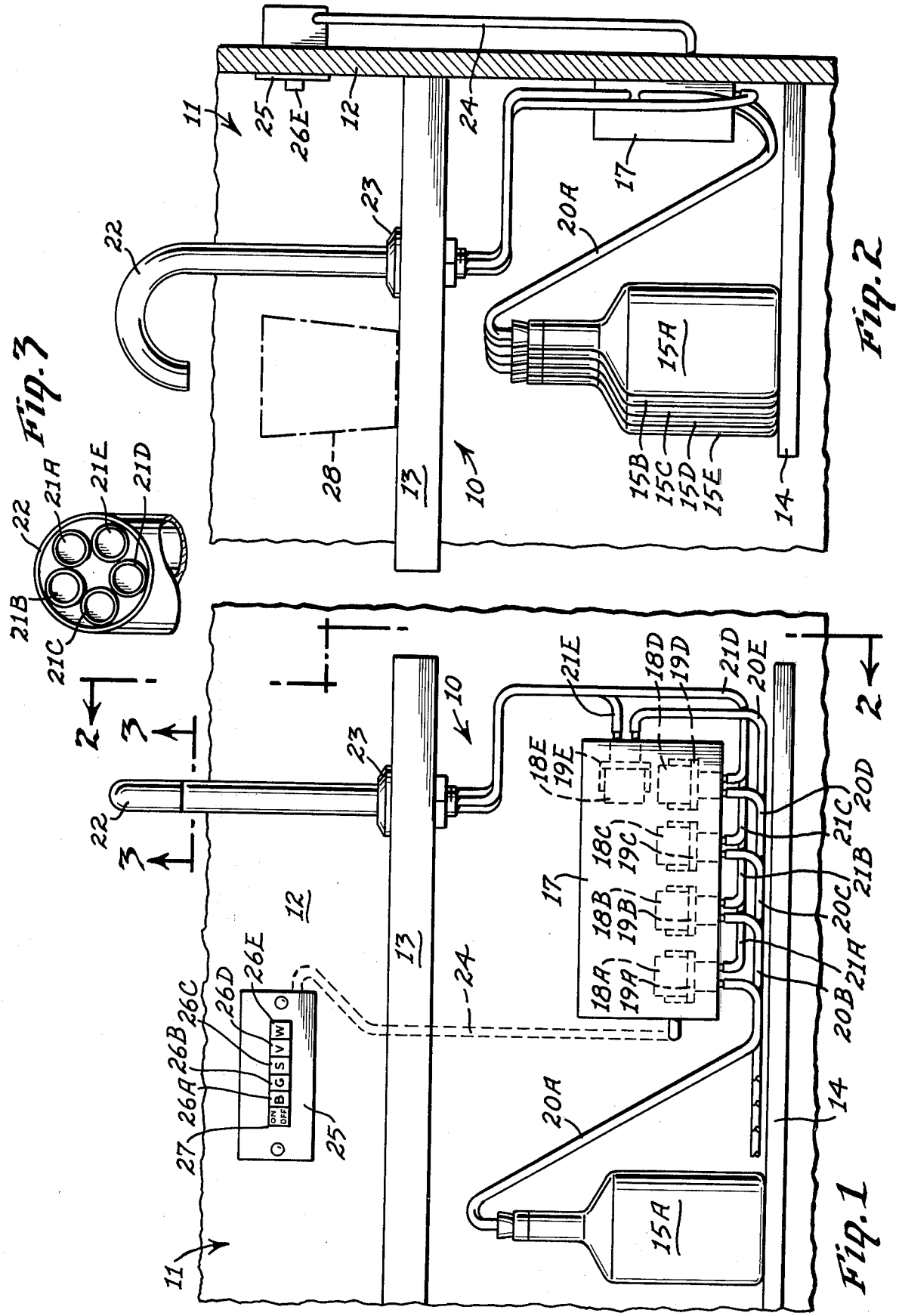

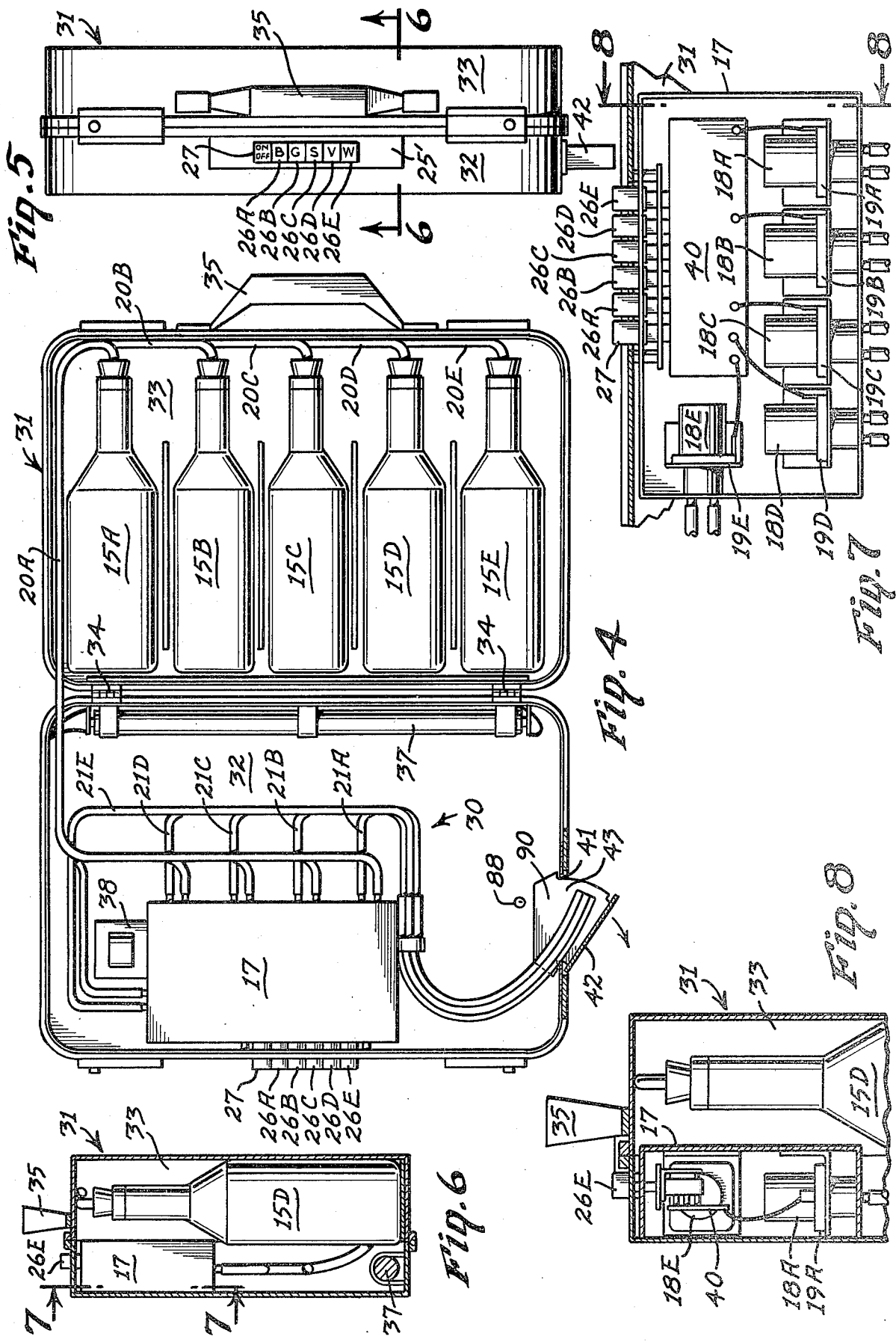

4,282,987

BEVERAGE DISPENSING AND METERING APPARATUS

BACKGROUND OF THE INVENTION

This invention relates to a liquid dispensing apparatus, and more particularly to a beverage dispensing and metering apparatus.

Beverage dispensing and metering devices of many types are well known in the art, as exemplified in the following U.S. Pat. Nos.:

| | |
|---|---|
| 1,261,986 White | April 9, 1918 |
| 3,853,245 Branch et al | Dec. 10, 1974 |
| 3,940,019 Kross et al | Feb. 24, 1976 |
| 3,976,222 Spagnolo | Aug. 24, 1976 |

The Branch patent discloses a beverage dispensing and metering apparatus in which the metered amount of liquid is controlled by a predetermined stroke of the piston within the metering pump.

Although both Kross and Spagnolo include electronic timing circuits, nevertheless, once the push-button switch has been closed, the timer circuit remains energized until the predetermined metered amount of liquid has been dispensed. There is no provision in the above cited references for dispensing a desired amount of liquid less than the metered amount.

SUMMARY OF THE INVENTION

It is therefore an object of this invention to provide a beverage dispensing and metering apparatus including electrically driven liquid pumps and controls for dispensing individual liquids in any desired amount.

Furthermore, this apparatus includes control circuitry which permits the operator to retain manual control over the amount of liquid dispensed at any given time during a metering cycle by releasing the individual dispenser push-button switch. When the dispenser push-button switch remains depressed for the entire period of the metering cycle, then only the metered amount of liquid will be dispensed. An amount of liquid greater than the metered amount may be dispensed by releasing the push-button switch at the end of the metering period and repeating the depression of the push-button switch until the desired extra amount of liquid has been dispensed.

This apparatus includes a dispensing spout enclosing the outlet portions of all the dispensing lines or tubes. In the portable modification of the apparatus, the spout is adapted to be mounted in a registering opening in a side wall of the housing and adapted to be protracted and retracted for its respective operative dispensing and inoperative positions. Associated with the dispensing spout is an opaque shutter adapted to be moved into the path of light directed at a photosensitive switch element in the electronic circuitry whereby none of the pump motors can be energized while the spout is in its inoperative position.

The apparatus is further characterized by an electrical interlocking switch system associated with the push-button switch members to control the electronic circuitry, so that only one pump motor is energized when its corresponding push-button switch is closed, and no pump motors are energized when two or more push-button switches are closed simultaneously.

The apparatus made in accordance with this invention is designed for operation in either stationary cabinet structures or in portable housings suitable for travel.

BRIEF DESCRIPTION OF THE DRAWINGS

FIG. 1 is a fragmentary front elevation of an apparatus made in accordance with this invention mounted in a stationary built-in cabinet structure, shown fragmentarily;

FIG. 2 is a fragmentary section taken along the line 2—2 of FIG. 1;

FIG. 3 is an enlarged fragmentary section taken along the line 3—3 of FIG. 1;

FIG. 4 is a top plan view of a modified form of the apparatus mounted in a suitcase-type housing in open position;

FIG. 5 is a top plan view of the apparatus disclosed in FIG. 4 in closed position;

FIG. 6 is a section taken along the line 6—6 of FIG. 5;

FIG. 7 is an enlarged fragmentary section taken along the line 7—7 of FIG. 6;

FIG. 8 is a fragmentary section taken along the line 8—8 of FIG. 7;

DESCRIPTION OF THE PREFERRED EMBODIMENTS

Figure 9:
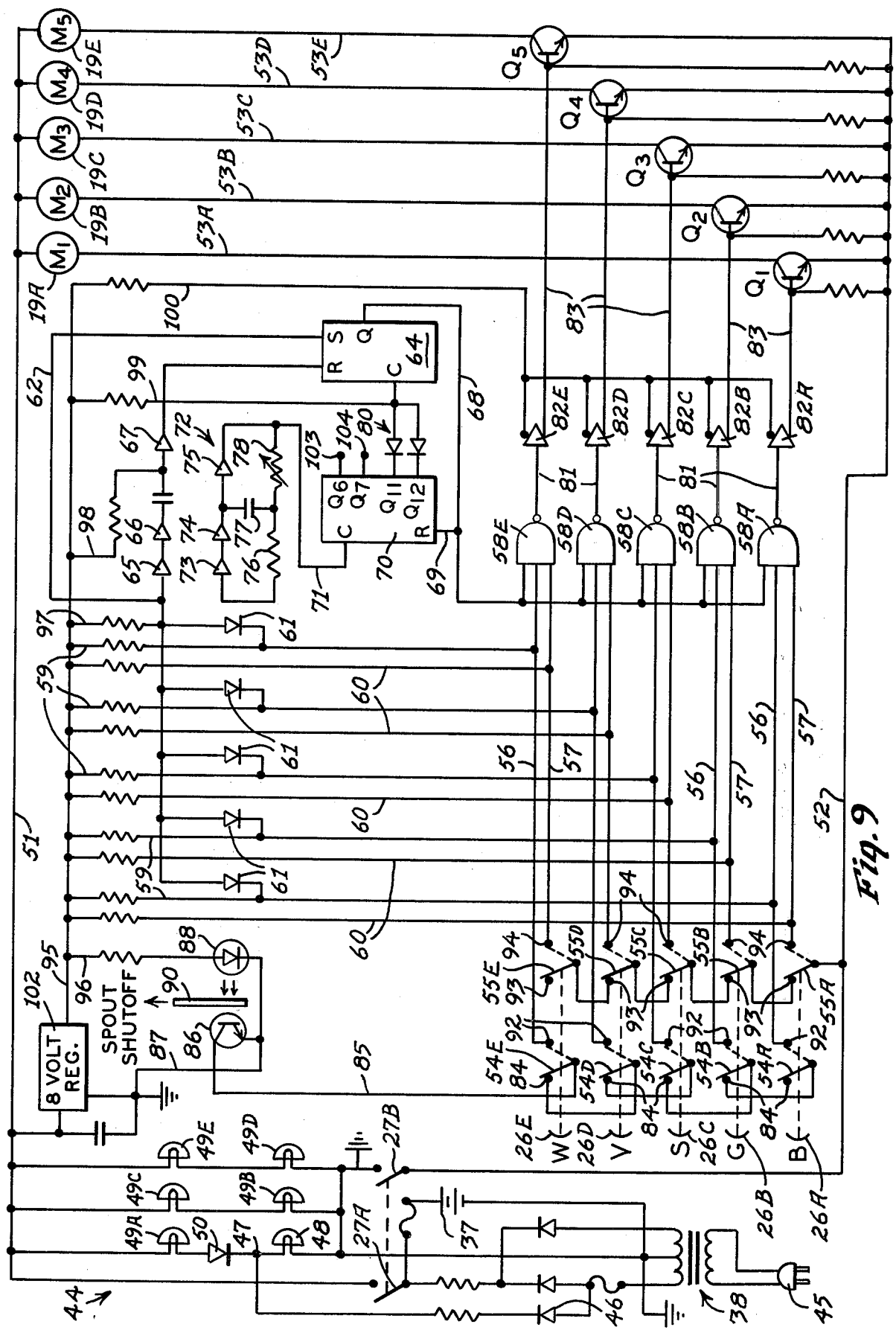
FIG. 9 is a schematic electronic circuit diagram of the apparatus.

Referring now to the drawings in more detail, FIGS. 1 and 2 disclose a beverage dispensing and metering apparatus 10, made in accordance with this invention and stationarily mounted within a built-in cabinet structure 11. The particular cabinet structure 11 disclosed in the drawing includes a back wall 12, counter or cabinet top 13 and a lower shelf 14 beneath the cabinet top 13.

Mounted upon the lower shelf 14 are a plurality of liquid storage containers, in the form of five liquor bottles 15A, 15B, 15C, 15D and 15E (FIG. 2).

Each one of the liquor bottles contains a different kind of liquor. For example, the bottle 15A might contain bourbon; the bottle 15B-gin; the bottle 15C-scotch; the bottle 15D-vodka; and the bottle 15E-blended or Canadian whiskey.

Mounted upon the back wall 12 beneath the cabinet top or counter 13 is a control box 17 including 5 corresponding fixed-displacement rotary pumps 18A, 18B, 18C, 18D, and 18E, each driven by an electric motor 19A, 19B, 19C, 19D, and 19E, respectively.

In fluid communication between each of the bottles 15 and the inlets to the corresponding pumps 18 is a liquid supply line or tube 20A, 20B, 20C, 20D, and 20E, respectively. Communicating with each of the outlets of the pumps 18A–E is a liquid dispensing line 21A, 21B, 21C, 21D and 21E. The liquid dispensing lines 21 together pass through a dispenser head or spout 22 fixed into a corresponding opening in the counter 13 by means of a collar assembly 23.

The electric motors 19 are connected to electronic circuitry within the control box 17. The circuitry includes appropriate leads in the cable 24 connected to the control panel 25 having dispenser push-button switches 26A–E and the main push-button on-off switch 27. The control panel 25 may be mounted on the back wall 12 above the counter top 13 within convenient reach of the operator, and in proximity to the spout 22.

In the operation of the apparatus 10, a beverage glass or tumbler 28 is placed under the spout 22, the main switch 27 is depressed and the individual push-button switch 26 is depressed to dispense the desired beverage. For example, if the operator wishes to have a glass of bourbon, he punches the push-button switch 26A (identified "B") which energizes the electronic control circuitry within the control box 17 to energize the electric motor 19A to drive the liquid pump 18A thereby discharging Bourbon from the container 15A through the supply tube 20A, pump 18A and dispensing line 21A through spout 22.

Other desired beverages may be dispensed by depressing the appropriate push-buttons 26B-26E.

The dispensing apparatus 30 disclosed in FIGS. 4-8 is substantially identical to the dispensing apparatus 10 disclosed in FIGS. 1-3, except the component parts have a different arrangement and are mounted in a portable suitcase housing 31, constructed in two half sections or chambers 32 and 33 joined along one longitudinal edge by the hinge members 34. The housing 31 is provided with a handle 35 to facilitate carrying the housing 31 in closed position, as disclosed in FIG. 5.

Most of the elements of the fluid dispensing systems of the apparatus 10 and 30 are the same and bear the same reference numerals. The liquor bottles 15, control box 17, pumps 18, motors 19, liquid supply lines 20, liquid dispensing lines 21, control panel 25, push-button switches 26 and the main switch 27 are the same as those disclosed in FIGS. 1 and 2. Moreover, these components in the apparatus 30 operate in the same manner as those in the apparatus 10.

The apparatus 30 also includes a battery 37 and a transformer 38 to provide a portable power supply.

The spout 42, disclosed particularly in FIG. 4, is adapted to be protracted and retracted in the end wall of the chamber 32, so that liquid can be dispensed through one of the outlet lines 21 from the apparatus 30 within the housing 31 when the chambers 32 and 33 are closed, without opening the housing 31. Thus, the retractable spout 42, having side walls 43 and the free end portions of the outlet lines 21 adapted to extend through a corresponding opening 41 in the end wall of the chamber 32. The push-button control panel 25' is also mounted on the outside, and specifically, in the top wall of the portable housing 31, so that liquid can be dispensed while the suitcase housing 31 is closed.

The electronic circuit 44 for the apparatus 30 is best disclosed in the schematic circuit diagram of FIG. 9.

The electrical circuit 44 is designed to operate the portable dispensing apparatus 30 only by battery power. The 115-volt transformer 38 and power supply plug 45 are designed to receive external household current merely for recharging the battery 37, but are not designed to supply power to the apparatus 30 without the battery 37.

When the push-button switch 27 is open, so that circuit switches 27A and 27B are open, and the power plug 45 is inserted into a supply socket, power is supplied through the diode 46 to junction 47. Thus current passes only through the lamp 48 to indicate that the battery 37 is being charged. The remaining push-button lamps 49A, 49B, 49C, 49D and 49E, which, when energized, illuminate the corresponding push-button switches 26A, 26B, 26C, 26D, and 26E, are not illuminated as long as the main switches 27A and 27B remain open. The push-button lamp 49A remains deenergized by virtue of the blocking diode 50 between the lamp 49A and the junction 47. On the other hand, when the switches 27A and 27B are closed, all of the dispensing push-button lamps 49A-E immediately become illuminated, and the charge indicator lamp 48 becomes illuminated with greater intensity as long as the supply plug 45 is engaged in the power supply outlet, as shown, since the charge indicator lamp 48 is receiving power from the transformer 38 as well as additional current from the push-button lamp 49A.

The main switch 27A connects the battery 37 to the 12-volt supply line 51, while the main switch 27B connects the opposite side of the battery 37 to the grounded common line 52.

Connected between the supply line 51 and the common line 52, in parallel, are five pump motor circuits 53A-E, each circuit 53 including, in series, a corresponding motor 19A-E and the collector-emitter circuits of transistors Q1, Q2, Q3, Q4 and Q5, respectively.

Each of the push-botton switches 26A-E is adapted to simultaneously actuate a corresponding interlock switch 54A-E and input switch 55A-E. When the corresponding push-button switch 26 A-E is depressed, the corresponding interlock switches 54A-E and input switches 55A-E are adapted to move to the dash-line positions disclosed in FIG. 9 to close a pair of input circuits 56 and 57 to corresponding CMOS (Complementary Metal Oxide Semi-Conductor) NAND gates 58A-E.

Each of the input lines 56 and 57 receive power from the 8-volt supply line 95, when the main switches 27A and 27B are closed, through the resistive lines 59 and 60, respectively.

Each of the resistive lines 59 is connected through a diode 61, all diodes 61 being connected in parallel, and through the set input line 62 to the set input S of the FLIP-FLOP component 64. The same diodes 61 are also connected in parallel to three inverter amplifiers 65, 66 and 67, connected in series, to the reset input R of the FLIP-FLOP 64. The Q output of the FLIP-FLOP 64 is connected through input lead 68 to the third input of each of the corresponding NAND gates 58A-E.

Input lead 68 is also connected through reset lead 69 to counter 70, specifically disclosed in the form of a 12-stage binary divider. Connected to the clock input C of the counter 70, through clock input line 71, is an oscillator circuit 72, including inverter amplifiers 73, 74, 75, resistor 76, capacitor 77 and potentiometer 78, connected in closed loops as shown.

The Q11 and Q12 outputs of the counter 70 are ANDED by the counter output circuitry 80, and the resultant signal applied to the clock input C of the R-S FLIP-FLOP component 64.

The output of each NAND gate 58A-E is connected through lead 81 to the input of a corresponding CMOS power driver 82A-E. The output of each power driver 82A-E is connected through biasing lead 83 to the base of each of the corresponding transistors Q1-Q5.

The interlock switches 54A-E are connected in series through their "OFF" terminals 84 through line 85 to the collector of a phototransistor 86, whose emitter is grounded through line 87. The phototransistor 86 is adapted to be driven into conduction by the rays from a lamp, such as the LED (Light Emitting Diode) 88. When the rays from the LED 88 are blocked by the shutter or vane 90 forming a part of the side wall 43 of the movable spout 42, when the spout is retracted, then the photoelectric transistor 86 will not conduct, and therefore none of the interlock switches 54A-E will be grounded.

When any of the interlock switches 54A-E is moved to its actuated position to engage its "ON" terminal 92, that particular switch 54 closes its corresponding input circuit 56.

When each of the input switches 55A-E engages its "OFF" terminal 93, the input switches 55A-E are connected in series to the common ground line 52. When any of the input switches 55A-E engages its "ON" terminal 94, that particular switch 55 connects the corresponding input circuit 57 to the grounded common line 52.

An 8-volt regulator is connected to the voltage supply line 51 in order to reduce the voltage from 12-volts to 8 volts to the auxiliary voltage supply line 95. The auxiliary voltage supply line 95 supplies the LED 88 through resistive line 96, supplies all of the resistive lines 59 and 60, the resistive line 97 connected to the diodes 61, the resistive line 98 connected to the inverters 65, 66, and 67, the resistive line 99 to the counter output circuitry 80, and the supply line 100 for the power drivers 82A-E.

In the operation of the portable apparatus 30 incorporating the electronic circuit 44, the power supply plug 45 may or may not be inserted into a corresponding supply outlet. If the plug 45 is inserted into a corresponding outlet, then the charge indicator lamp 48 will illuminate, to indicate that the battery 37 is charging.

In order to place the electronic circuit 44 in the standby state, the main push-button switch 27 is depressed to close the main switches 27A and 27B, thereby applying the 12-volt power to the supply line 51 and the 8-volt supply voltage to the auxiliary line 95.

The operator of the apparatus 30 will protract the spout 42, simultaneously removing the vane 90 from the path of the light rays from the lamp 88 to the photoelectric element or photoelectric transistor 86, permitting the photoelectric transistor 86 to conduct.

Moreover, when the switches 27A and 27B are closed, all of the lamps 48 and 49 will conduct to illuminate their respective push-buttons 27 and 26A-E.

In the standby state, all of the switches 54 and 55 are in the solid-line positions of FIG. 9, engaging their respective "OFF" contacts 84 and 93.

All three inputs to the NAND gates are in their high state, while all of the outputs from the NAND gates 58 and the inputs to the power drivers 82 are in their low states. Consequently, all of the transistors Q1-Q5 are off or non-conductive, to turn off the corresponding pump motors 19.

When it is desired to pour or dispense a drink from one of the bottles, such as bourbon from the bottle 15A, the push-button 26A is depressed causing simultaneous movement of the switches 54A and 55A from their contacts 84 and 93 to the contacts 92 and 94, respectively, in their "ON" positions. When the switches 54A and 55A are on, two of the inputs from the NAND gate 58A are grounded through their respective lines 56 and 57. The line 56 is grounded through the interlock switch 54A and its connection in series with all of the remaining interlock switches 54B-E, line 85, photoelectric transistor 86, and grounded line 87. The input line 57 is grounded through the input switch 55A to the grounded common line 52.

Simultaneously, the set input S of FLIP-FLOP 64 is grounded through set input lead 62 and the corresponding diode 61 connected to the line 59 which is connected to the grounded input line 56 of the NAND gate 58A. Also, the inverter 65 is grounded through the same circuitry to apply a low-state input signal to the inverter 65, thereby creating a positive pulse at the output of the inverter 67 which is transmitted to the reset input R of the FLIP-FLOP 64. This reset input pulse, coupled with the low-state signal at the set input causes the Q output of FLIP-FLOP 64 to shift to a low state, thereby causing the third input to the NAND gate 58 to go low. This low-state signal transmitted through the lead 68 is also transmitted through reset input lead 69 to the counter 70. When all three inputs to the NAND gate 58A have been shifted to their low state, the output from the NAND gate 58A goes high and is transmitted through line 81 to create a high input to the driver 82A. Thus the driver 82A produces an output signal transmitted through the biasing lead 83 to bias the transistor Q1 into conduction, thereby energizing the motor 19A to drive its corresponding pump 18A to discharge bourbon from the bottle 15A through the fluid line 20A, pump 18A and dispensing line 21A.

Flow of the liquid continues as long as the button 26A is depressed, but no longer than the pre-set time period determined by the counter 70 and FLIP-FLOP 64. The time period is determined by the frequency generated by the oscillator circuit 72 connected to the counter 70. This output frequency of the oscillator 72 is impressed upon the clock input C of the counter 70, which in turn generates output through the output circuitry 80 which is impressed upon the clock input C of the FLIP-FLOP 64. When the clock input C of the FLIP-FLOP 64 goes high the Q output of the FLIP-FLOP 64 also goes high to cause the third input to the NAND gate 58 to go high. The states of the output of the NAND gate 58A and the input of the power driver 82A are consequently shifted back to their standby conditions to turn off the transistor Q1, thereby shutting off the motor 19A to cease dispensing the liquid, specifically bourbon, from the bottle 15A.

The amount of liquid dispensed by continuously holding the particular push button 26 may be varied to dispense any amount between possibly $\frac{1}{2}$ ounce to three ounces by varying the resistance of the potentiometer 78 in the oscillator circuit 72. By actually replacing the resistor 76 and capacitor 77 with like components of different values, the amount to be dispensed can be varied over wider ranges.

The circuit 44 is so designed that at any time the operator removes pressure from the particular push-button switch 26, dispensing of that particular liquid immediately ceases. Therefore, it is possible for the operator to dispense less than the metered amount automatically dispensed by continual depression of the push-button switch. For example, if the circuit 44 is designed to automatically dispense one jigger ($1\frac{1}{2}$ ounces) by continually pressing any one of the push-button switches 26, then a lesser amount may be dispensed by removing the finger pressure from the push-button switch 26 at the desired time.

The fact that the set input S of the FLIP-FLOP 64 is directly connected through line 62, diode 61 and line 59 to the input lead 56, permits more than the metered amount to be dispensed by releasing the push-button 26 after the metered amount has been dispensed and then depressing the switch 26 again for a desired length of time. Such an operation automatically resets the counter and FLIP-FLOP 64 so that an additional predetermined metered amount may be dispensed for as many cycles as the push-button switch is removed and redepressed.

The vane 90 is a safety device to prevent the pouring spout 42 from dispensing any amount of any kind of liquid when the spout 42 is in its retracted position, even if the main push-button switch 27 has been depressed.

The purpose of the interlocking switches 54A–E is to prevent the dispensing of two or more liquids at one time in the event that two or more push-button switches 26 are depressed. For example, if push-button switches 26A and 26B are depressed at the same time, either intentionally or accidentally, bourbon and gin will not be dispensed simultaneously. In fact, neither bourbon nor gin nor any other liquid will be dispensed under this condition.

When both push-button switches 26A and 26B are depressed, their corresponding switches 54A, 55A, 54B and 55B will be shifted to the dash-line positions of FIG. 9. The input line 57 from the NAND gate 58A will be grounded through the closed switch 55A to the grounded common 52, thereby changing that input to the NAND gate 58A to low. However, the input line 56 in NAND gate 58A will not be grounded, even though the interlock switch 54A is in its "ON" position, because the interlock switch 54B will open the grounded series circuit from switch 54A to the line 85. Therefore, the input to NAND gate 58A through line 56 will remain high, and NAND gate 58A will remain inoperative and no bourbon will be dispensed.

On the other hand, the input line 56 connected to NAND gate 58B will conduct through the closed switch 54B and be grounded through the line 85, phototransistor 86 and grounded line 87. However, the line 57 will not be grounded even though the switch 55B is closed, because the switch 55A is disengaged from its contact 93 so that there is no connection between the switch 55B and the grounded common line 52. Accordingly, the input to the NAND gate 58B through line 57 remains high and consequently no liquid (gin) controlled by the motor 19B will be dispensed.

Thus, liquid can be dispensed from the apparatus 30 only if one push-button switch 26, at a time, is depressed.

Of course, a 12-volt DC power supply can be provided which will supply outside voltage to the circuit 44 in addition to, or instead of, a battery 37. Such a substitute outside power supply would be required for the apparatus 10 which is permanently mounted in a built-in cabinet structure 11.

It is of course possible to employ more or less dispenser units, such as 6 bottles or 3 bottles, with their respective electronic circuits and fluid circuits, without disturbing the overall function of either apparatus 10 or 30, or the electronic circuit 44 or equivalent circuit.

What is claimed is:

1. A beverage dispensing and metering apparatus comprising:
   (a) a plurality of liquid pumps, each pump having an inlet and an outlet,
   (b) an electric motor drivingly connected to each of said pumps,
   (c) a liquid supply line in fluid communication with each of said pump inlets, each supply line being adapted to lead from a separate liquid storage container,
   (d) a liquid dispensing line in fluid communication with each of said pump outlets,
   (e) electrical power supply means,
   (f) an individual electrical motor control circuit connected to a corresponding electric motor and to said power supply means,
   (g) manually operable switch means in each of said motor control circuits,
   (h) each said manually operable switch means comprising ganged first and second switches for simultaneous manual actuation between an open position for de-energizing said corresponding electric motor and a closed position for energizing said corresponding electric motor, and
   (i) first interlocking circuit means for electrically coupling all of said first switches and second interlocking circuit means for electrically coupling all of said second switches, whereby manual actuation of only one of said switch means to its closed position will energize only its corresponding electric motor and simultaneously de-energize each of said other electrical motors, and simultaneous actuation of any two or more of said switch means to their open positions will simultaneously de-energize all said electric motors regardless of the positions of said other switch means.

2. The invention according to claim 1 in which each of said motor control circuits includes an input electrical switching component having at least first and second input leads, each of said first and second ganged switches being a single-throw, double-pole switch, said double-poles constituting a corresponding operable pole and a corresponding inoperable pole, all of the operable poles of said first switches being connected to said corresponding first input leads, and all of the operable poles of said second switches being connected to said corresponding second input leads, said first interlocking circuit means connecting said first switches in series to a voltage source when said first switches engage said corresponding inoperable poles, and said second interlocking circuit means connecting all of said second switches in series to a voltage source when said second switches engage said corresponding inoperable poles.

3. The invention according to claim 2 in which said motor control circuit includes a motor drive circuit, each motor drive circuit having a motor switch means therein for energizing its corresponding motor when in a closed position, said input electrical switching component comprising an electronic switching component for transmitting signals to said corresponding motor switch means, whereby when both input leads to said electronic switching component are in a predetermined voltage state, said component transmits a signal to close said corresponding motor switch means to energize said corresponding motor.

4. The invention according to claim 3 in which said electronic switching component comprises a NAND gate.

5. The invention according to claim 4 in which each of said NAND gates is in series with a power driver component.

6. The invention according to claim 4 further comprising an electronic timer circuit connected to a third input of each of said NAND gates.

7. The invention according to claim 3 in which each of said motor switch means comprises a transistor switch means having its corresponding emitter-collector circuit connected in series in said corresponding motor drive circuit, and the base of each transmitter means being connected to the output of each of the corresponding electronic switching components.

8. A beverage dispensing and metering apparatus comprising:
(a) a plurality of liquid pumps, each pump having an inlet and an outlet,
(b) an electronic motor drivingly connected to each of said pumps,
(c) a liquid supply line in fluid communication with each of said pump inlets, each supply line being adapted to lead from a separate liquid storage container,
(d) a liquid dispensing line in fluid communication with each of said pump outlets,
(e) electrical power supply means,
(f) an individual electrical motor control circuit connected to a corresponding electric motor and to said power supply means,
(g) a manually operable switch in each of said motor control circuits shiftable between an open position for de-energizing said corresponding electric motor and a closed position for energizing said corresponding electric motor,
(h) a dispensing spout,
(i) each of said liquid dispensing lines having an outlet end portion contained within said spout,
(j) closure means for selectively closing and opening said spout,
(k) shut-off switch means operatively associated with said spout closure means and electrically connected to all of said motor control circuits,
(l) switch actuator means forming a part of said closure means for de-actuating said shut-off switch means when said closure means closes said spout for de-energizing all said motor control circuits, and for actuating said shut-off switch means when said closure means opens said spout for energizing all said motor control circuits.

9. The invention according to claim 8 in which said shut-off switch means comprises a photosensitive element in electric communication with said motor control circuits and a lamp adapted to emit radiant energy for actuating said photosensitive element, said switch actuator means comprising shutter means mechanically connected to said spout closure means for movement to a position blocking the radiant energy to said photosensitive element from said lamp when said closure means closes said spout.

* * * * *